No. 656,329. Patented Aug. 21, 1900.
R. SCHULTE-BLOME.
MANURE AND SEED DISTRIBUTER.
(Application filed Sept. 30, 1899.)
(No Model.)
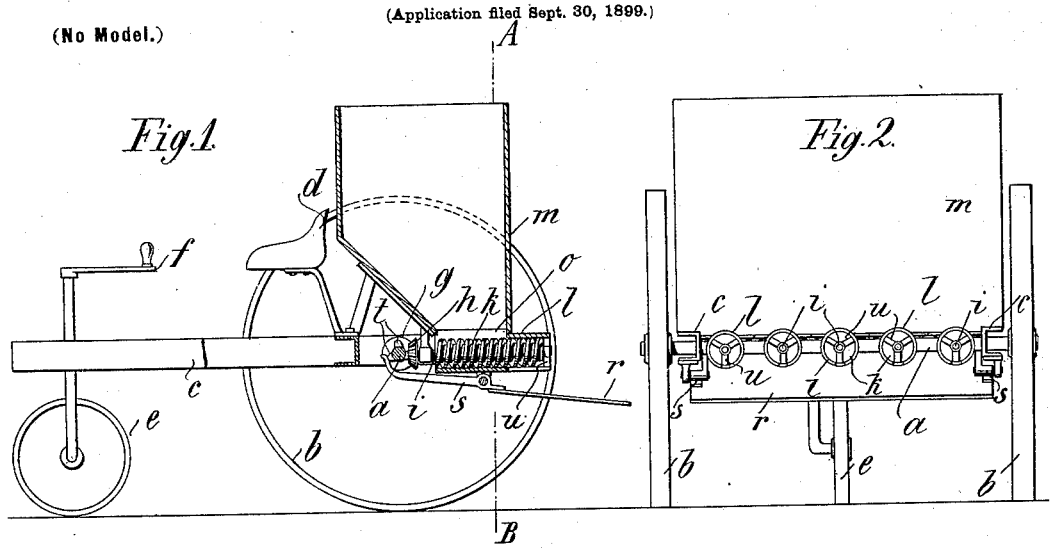
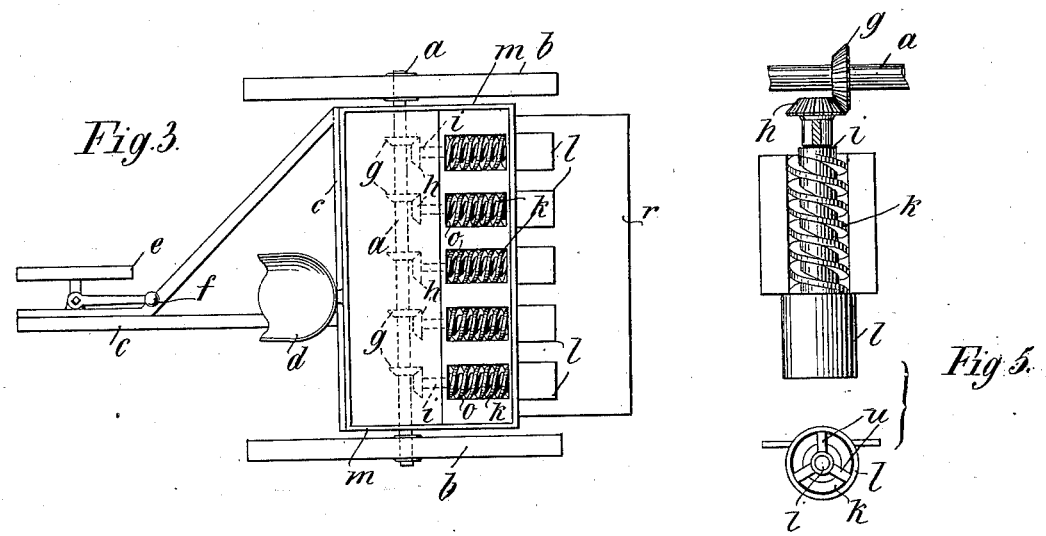
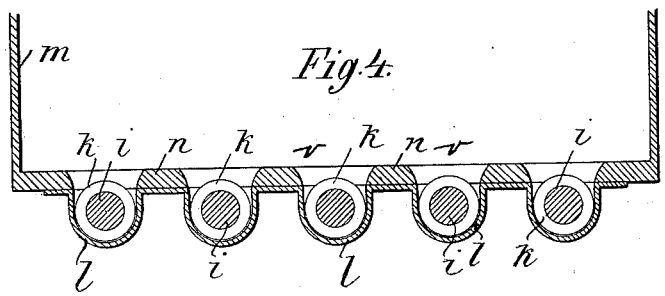
Witnesses:
Inventor:

UNITED STATES PATENT OFFICE.

RUDOLF SCHULTE-BLOME, OF SIEVERINGSEN, GERMANY.

MANURE AND SEED DISTRIBUTER.

SPECIFICATION forming part of Letters Patent No. 656,329, dated August 21, 1900.

Application filed September 30, 1899. Serial No. 732,251. (No model.)

*To all whom it may concern:*

Be it known that I, RUDOLF SCHULTE-BLOME, farmer, a subject of the King of Prussia, German Emperor, residing at Sieveringsen, Post Ostonen, near Soest, Germany, have invented new and useful Improvements in Manure and Seed Distributing Machines, of which the following is a specification.

The present invention relates to improvements in machines for distributing artificial manure and seeds, the purpose of the invention being to obtain a uniform distribution of the manure and the seeds, respectively, even under unfavorable conditions of the ground.

A further purpose of the present invention is to simplify the construction of such machines, so that disturbances in the action of the machine are obviated.

With this end in view the invention consists in certain novel combinations, constructions, and arrangements of parts, as will be more fully described hereinafter and the essential elements of which are recited in the appended claim.

In the accompanying drawings a machine constructed according to the present invention is shown, in which—

Figure 1 is a side elevation, partly in section. Fig. 2 shows a rear elevation; Fig. 3, a plan view of the machine; Fig. 4, a section on line A B of Fig. 1 on an enlarged scale. Fig. 5 shows the feed-worm of the machine, likewise on an enlarged scale.

The fore-carriage $c$ of the machine is mounted on the axle $a$, which supports the wheels $b\, b$. The fore-carriage $c$ is fitted with the driver's seat $d$ and is steered by means of the wheel $e$ in connection with the steering-rod $f$. The axle $a$ has keyed thereto as many bevel-wheels $g$ as there are feed-worms in the machine. Bevel-wheels $h$ mesh with the bevel-wheels $g$. These bevel-wheels $h$ are mounted on the shaft $i$ of each of the conveyer-worms $k$. The conveyer-worms $k$, which may be made of any suitable and desired material, are inclosed in tight-fitting casings $l$. The receptacle $m$, holding the material to be distributed, is secured to the fore-carriage $c$ above the axle $a$ in any suitable manner. The bottom $o$ of the receptacle $m$ is fitted with longitudinal slots $v$, beneath which the casings $l$ of the conveyer-worms $k$ are secured. These casings $l$, in accordance with the longitudinal slots $v$ in the bottom $o$, are fitted with apertures. A rocking plate $r$ is attached to the fore-carriage $c$ beneath the casings $l$. The rocking of the plate $r$ is effected by fitting arms $s$ to its inner end, which rest on the axle $a$ and are rocked by projections $t$ on said axle when the wheels $b$ move. I wish it, however, to be understood that I do not confine myself to this mode of rocking the plate $r$, as any other method may be employed in accordance with requirements or desire. The free ends of the casings $l$ are open and fitted with cross-bars $u$, which insure a uniform exit of the material to be distributed. The screw-threads in the conveyer-worms $k$ may be chosen to suit the requirements. They may assume the form of acute angles in cross-section, or they may be rectangular, according to the nature of the material to be distributed.

The operation of the machine is as follows: The receptacle $m$ having been filled, the machine is set in motion, whereby the material drops through the slots in the bottom of the receptacle and through the apertures in the casings $l$ onto the conveyer-worms $k$. The motion of the machine rotates, by virtue of the turning of the axle $a$, the bevel-wheels $g$, which impart their motion to the bevel-wheels $h$, and consequently to the conveyer-worms $k$, the screw-threads of which are filled with the material to be distributed dropped into same, as above described. The rotation of the worms $k$ conveys the material to the free end of the casings $l$, where it comes into contact with the cross-bars $u$ and is dropped onto the rocking plate $r$ and finally distributed on the ground.

Having now particularly described my invention, what I claim as new, and desire to secure by Letters Patent, is—

The combination in a seed and manure distributing machine of a three-wheeled vehicle, the third front wheel adapted to be steered by means of a hand-rod from the driver's seat, a seed or manure receptacle situated behind the driver's seat on the vehicle-frame and fitted with openings in the bottom, casings surrounding these openings so as to receive the seed or manure through them, conveyer-worms situated in the aforesaid casings, said conveyer-worms driven from the vehicle-axle by bevel-wheel gearings, the free ends of the conveyer-worm casings fitted with a three-armed frame in the center of which one extremity of the conveyer-worm shaft is journaled and a rocking plate beneath the conveyer-worm casings, said plate rocked by projections on the vehicle-axle, substantially as described and shown and for the purpose indicated.

In testimony whereof I have hereunto set my hand in presence of two subscribing witnesses.

RUDOLF SCHULTE-BLOME.

Witnesses:
WILLIAM ESSENWEIN,
GEO. P. PETTIT.